United States Patent
Weller et al.

[11] Patent Number: 5,845,861
[45] Date of Patent: Dec. 8, 1998

[54] BELT RETRACTOR FOR A VEHICLE OCCUPANT RESTRAINING SYSTEM

[75] Inventors: Hermann-Karl Weller, Alfdorf; Franz Wier, Göggingen, both of Germany

[73] Assignee: TRW Occupant Restraint Systems GmbH, Alfdorf, Germany

[21] Appl. No.: 887,817

[22] Filed: Jul. 3, 1997

[30] Foreign Application Priority Data

Jul. 15, 1996 [DE] Germany ............ 296 12 279 U

[51] Int. Cl.⁶ .................................................. B60R 22/34
[52] U.S. Cl. ........................ 242/379; 280/807; 403/13
[58] Field of Search ................. 242/379, 379.1, 242/379.2; 280/803, 805, 806, 807, 808; 297/474–479; 403/342, 343, 13; 285/93

[56] References Cited

U.S. PATENT DOCUMENTS

| | | | |
|---|---|---|---|
| 1,543,576 | 6/1925 | Knoderer | 285/194 |
| 1,553,064 | 9/1925 | Blash | 285/194 |
| 1,594,224 | 7/1926 | Strongson | 285/194 |
| 1,978,229 | 10/1934 | Sass et al. | 403/343 |
| 4,303,209 | 12/1981 | Stephenson | 280/806 |
| 4,470,617 | 9/1984 | Yamada et al. | 280/806 |
| 4,655,159 | 4/1987 | McMills | 285/93 |
| 5,076,610 | 12/1991 | Struck | 280/806 |

*Primary Examiner*—John M. Jillions
*Attorney, Agent, or Firm*—Tarolli, Sundheim, Covell, Tummino & Szabo

[57] ABSTRACT

A belt retractor for a vehicle occupant restraining system comprises a load bearing frame provided with a sleeve-like cylindrical boss. The cylindrical boss has an external screw thread on which a nut may be screwed for the attachment of the belt retractor on the vehicle. An elongated guide pin extends through the cylindrical boss to provide for guidance of the nut.

17 Claims, 3 Drawing Sheets

BELT RETRACTOR FOR A VEHICLE OCCUPANT RESTRAINING SYSTEM

The invention relates to a belt retractor for a vehicle occupant restraining system.

BACKGROUND OF THE INVENTION

Conventionally belt retractors are mounted in vehicles using a screw means, which is screwed into an internal screw thread provided either on the vehicle or on the belt retractor.

BRIEF DESCRIPTION OF THE INVENTION

In contrast to this the invention provides a belt retractor for a vehicle occupant restraining system, which comprises a load bearing frame provided with a cylindrical boss. The cylindrical boss has an external screw thread on which a nut may be screwed for the attachment of the belt retractor on the vehicle. Owing to the employment of a boss provided with an external screw thread for the attachment of the belt retractor there is a whole series of advantages. By means of such a boss, which is set in a suitable mounting opening in the vehicle, the belt retractor may be tacked or preliminarily fixed during assembly without the nut having to be screwed on for this purpose. Furthermore the belt retractor may be extremely exactly fitted in position by the engagement of its boss in the mounting opening. Finally the attachment of a belt retractor using a boss is cheaper, since the boss having the external screw thread and the associated nut are cheaper than a screw or bolt and the associated nut.

In accordance with a preferred embodiment of the invention there is a provision such that the boss is formed integral with the frame. The design means that manufacture is even cheaper.

Furthermore the design may be such that the boss is sleeve-like. This leads to a reduction in material and in weight, since the boss only has to be produced with the wall thickness necessary for the screw thread and to achieve its necessary strength.

According to the preferred embodiment, it is provided that an elongated guide pin extends right through the boss for guiding the nut to be screwed onto the boss on the limb side of the frame. This guide pin constitutes a guide for the nut, when the same is being screwed on the boss. This is more particularly advantageous for belt retractors which must be fitted in place blind at a position in the vehicle to which there is insufficient access.

According to the preferred embodiment, it is further provided that the guide pin is provided with a central through hole, in which a signal pin is arranged. This signal pin may more particularly contribute to stabilize the guide pin, if same is manufactured of plastic for instance for reasons of weight and price.

According to the preferred embodiment, it is further provided that the signal pin protrudes from the end of the guide pin, which faces away from the bottom part of the belt retractor, and can be pushed into the through hole, a press fit being formed between the signal pin and the through hole. By a suitable design of the tool employed for screwing the nut onto the boss, the part of the signal pin projecting from the guide pin may be employed to check whether the nut is properly screwed onto the boss. If the nut is not screwed sufficiently far onto the boss, the tool employed for tightening up the nut will not thrust the part of the signal pin, extending from the guide pin, into the guide pin so that the signal pin will continue to extend from the guide pin. This will be clearly seen by eye, more particularly if the projecting part of the signal pin has a colored marking, as is provided according to the preferred embodiment.

In accordance with the preferred embodiment, there is the further provision that the end of the guide pin which faces away from the bottom part of the belt retractor, is provided with cut-outs extending radially in relation to the longitudinal axis of the guide pin. This embodiment as well, with the co-operation with a suitable design of the tool employed for tightening up the nut, may be used for checking that assembly has been properly carried out. If the tool is placed on the guide pin without any nut being present, the tool may be thrust so far onto the guide pin that projections on the tool fit into the cut-outs provided in the guide pin, to which the projections are complementary, so that on rotation of the tool in relation to the guide pin there will be distinctly noticeable vibrations.

Further advantageous developments of the invention are defined in the dependent claims.

BRIEF DESCRIPTION OF THE DRAWINGS

The invention will now be further described with reference to the preferred embodiment which is illustrated in drawings.

DETAILED DESCRIPTION OF THE INVENTION

Figure 1:
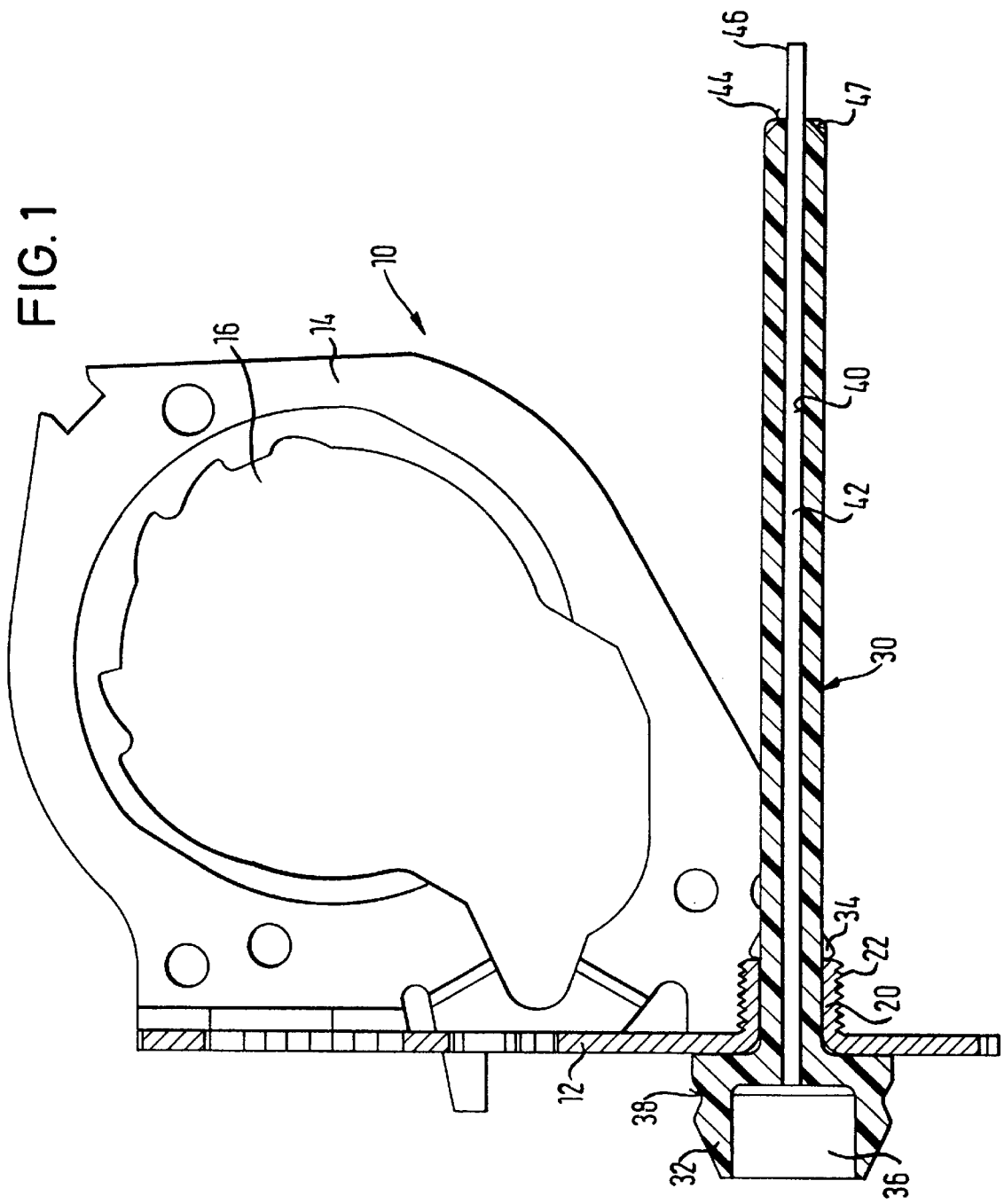
FIG. 1 shows a diagrammatic cross section taken through a belt retractor in accordance with the invention.

In FIG. 1 the reader will see a diagrammatic cross section taken through a belt retractor in accordance with the invention, the parts thereof not necessary for an understanding of the function of the invention being omitted in order to make the drawing more straightforward.

The belt retractor of the invention comprises a load bearing frame 10 of metal, which is U-like in its configuration and possesses a bottom part 12 and two limbs, of which only the limb 14 behind the plane of the section is visible. In each limb an opening 16 is formed in which a belt drum (not illustrated) is mounted in a rotatable fashion.

On the bottom part 12 a boss 20 is formed on the side facing the limbs, such boss being integral with the frame 10. This boss can be formed by flow pressing.

The boss 20 possesses the configuration of a sleeve, on whose outer peripheral surface an external screw thread 22 is formed, on which a nut may be screwed for the attachment of the belt retractor on the vehicle.

A plastic guide pin 30 extends through the boss 20. This guide pin 30 is provided with a head 32 on the side thereof facing away from the limbs of the frame 10, and the head engages the bottom part 12. The guide pin 30 is fixed in position in the boss 20 by a press fit between the inner wall surface of the boss 20 and the outer peripheral surface of the guide pin 30. Additionally a plurality of detent projections 34 are provided on the guide pin 30 and abut the end side of the boss 20 facing the limbs. Accordingly the guide pin 30 is fixed in position both frictionally by means of the press fit and also with an interlocking connection formed by means of the head 32 and the detent projections 34 on the frame 10.

The head 32 is provided with a detent recess 36 and a detent groove 38 running in the circumferential direction, the function thereof being described hereinbelow.

Along its longitudinal axis the guide pin 30 is provided with a central through hole 40, in which a signal pin 42 is arranged. The signal pin 42 of this embodiment is made from spring steel wire in order to obtain a high degree of elasticity. This wire pin extends out of the end 44 (which faces away from the head 32 and projects beyond the limbs of the frame 10) of the guide pin 30, as the projecting part 46. Preferably the design is such that at least the part 46 of the wire pin 42 is marked in color. The function of the color will also be explained below. The internal diameter of the through hole 40 and the external diameter of the wire pin 42 are so selected that there is a press fit by which the wire pin 42 is mounted in the guide pin 30 with a predetermined holding force. This holding force can more particularly be overcome by the application of a force acting in the longitudinal direction of the guide pin 30. The end 46 of the guide pin 30 is provided with radially extending cut-outs 47, whose function will also be described hereinbelow.

Figure 2:
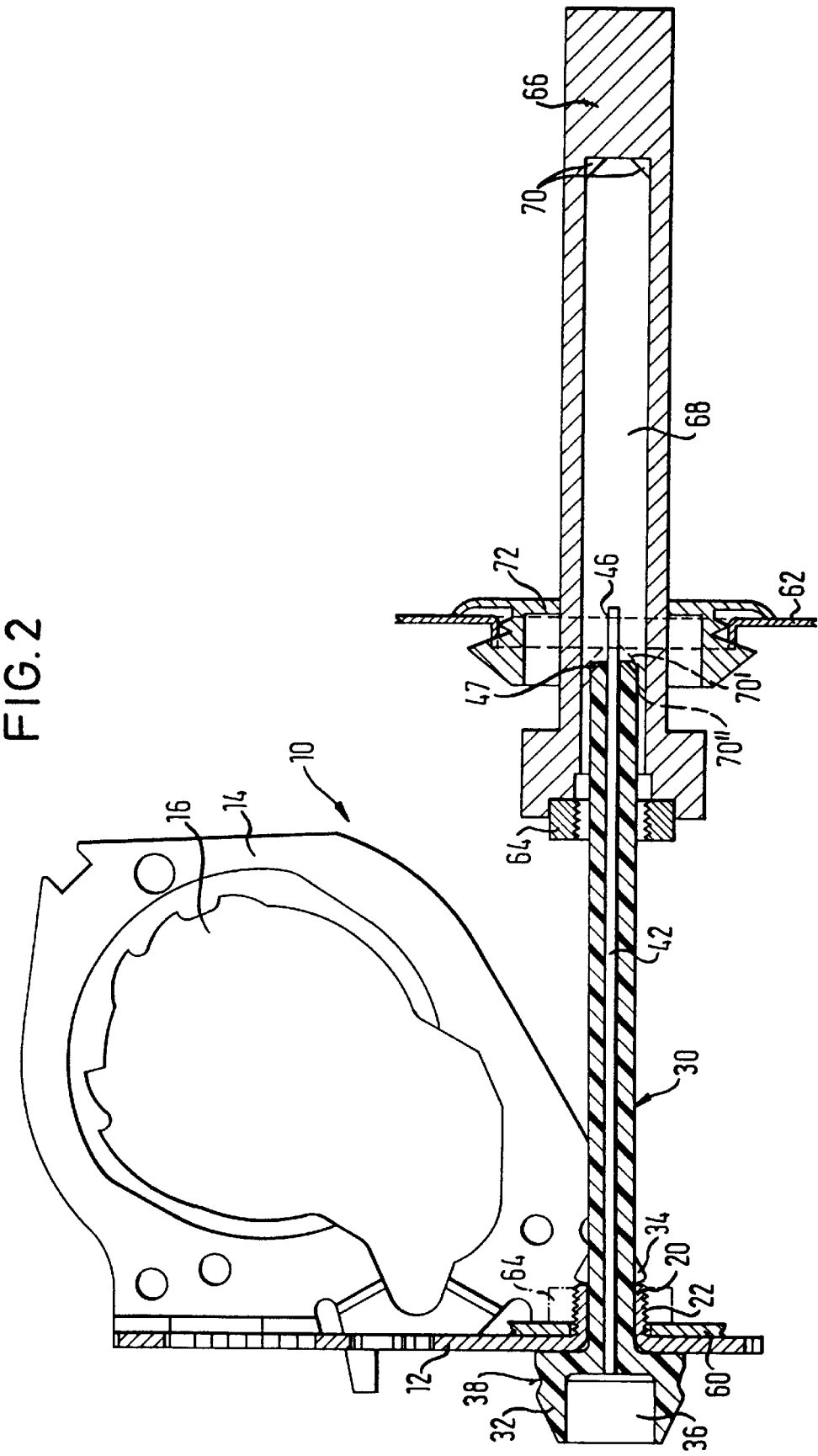
FIG. 2 diagrammatically depicts the belt retractor of FIG. 1 in the course of fitting it.

FIG. 2 diagrammatically shows the fitting of the belt retractor of FIG. 1 to a vehicle. The design of the belt retractor of FIG. 1 and in accordance with the invention is more particularly advantageous in cases in which the belt retractor must be installed at a position in the vehicle which is covered over and to which access from the outside is impaired. This is diagrammatically illustrated in FIG. 2. The belt retractor 10 is to be mounted in a cavity between a first bodywork part 60 and a second bodywork part 62, it having to be screwed to the first bodywork part 60, which for this purpose is provided with an opening whose internal diameter is adapted to the external diameter of the external screw thread 22 formed on the boss 20. In order to prepare for fitting the belt retractor can be connected with a cover (not illustrated), which is attached to the belt retractor by clipping into the detent recess 36 and the detent groove 38. Then the belt retractor is placed in the vehicle so that the boss 20 assumes a position within the opening in the bodywork part 60. The belt retractor is now preliminarily fixed in this stage without further attachment means being required. An attachment nut 64 is now screwed through an opening in the second bodywork part 62 onto the external screw thread 22. In this respect the guide pin 30 serves as a guide for the nut 64 and for a diagrammatically illustrated tool 66 employed for screwing on the nut. The tool 66 has a blind hole 68 and a socket for receiving the nut 64. On the bottom of the blind hole, projections 70 are provided which are complementary to the cut-outs 47 on the guide pin 30.

During proper assembly the guide pin 30 will guide the tool 66 and the nut 64 as far as to the boss 20, and by rotating the tool 66 it is possible for the nut 64 to be screwed onto the external screw thread 22. The blind hole 68 is of such a size that its bottom comes into engagement with the projecting part 46 of the wire pin 42, thrusting same, simultaneously with the screwing on of the nut 64 on the external screw thread 22, into the guide pin 30. After the removal of the tool 66 this condition can be simply checked by eye: if the colored part 46 of the wire pin 42 is still visible, the nut is either not screwed onto the external screw thread 22 or is not screwed sufficiently onto it. In order to provide for mechanical checking in addition to checking by eye the length of the part 46 is of such a size that the opening for the tool 66 in the bodywork part 62 can only be shut off by a cover 72 to be placed here if the part 46 is thrust sufficiently far into the guide pin 30.

The design in accordance with the invention additionally ensures that the absence of the nut 64 during fitting the belt retractor will also be noticed. Should the tool 66 be placed against the guide pin 30 without any nut 64 and thrust toward the boss 22, this will also lead to the part 46 being pushed inward so that correct assembly would be wrongly indicated. However if there is no nut 64 the tool 66 may be so far thrust onto the guide pin 30 that the projections 70 at the bottom of the blind hole 68 will fit into the cut-outs 47 at the end 44 of the guide pin 30 so that, if the tool 66 is rotated in order to screw up the nut 64 assumed to be present, distinctly noticeable vibrations appear indicating faulty assembly. In FIG. 2 the position of the projections 70 is indicated in broken lines at 70' when the nut 64 is properly present whereas the position of the projections 70 is denoted in broken lines at 70" when the nut is missing. Instead of the cut-outs 47 and the projections 70 it would also be possible to provide a switch on the bottom of the blind hole 68, which, when the tool 66 is thrust too far onto the guide pin 30, as is the case if the nut 64 is missing, is operated and produces a warning signal.

Figure 3:
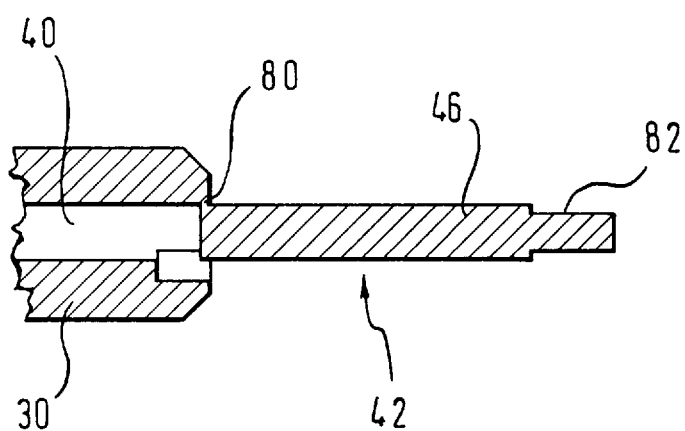
FIG. 3 shows schematically the front end of a guide pin with a signal pin according to a variant.

FIG. 3 shows a variant of the signal pin 42. According to this embodiment, the signal pin is not formed by a wire pin extending through the through hole 40, but by a signal pin formed integrally with the guide pin. The signal pin is connected to the guide pin 30 by means of a predetermined breaking point 80. In the initial condition, a small portion of the signal pin extends into the through hole 40 while the major portion of the guide pin protrudes from the end of the guide pin 30, which faces away from the bottom part. The signal pin 42 has a configuration 82 adapted for a formlocking connection at its free end. The configuration 82 can be engaged by a complementary shaped configuration at the bottom of the blind hole 68 of the tool 66 so that the rotary movement of the tool is transmitted to the signal pin in order to facilitate breaking off the signal pin. In the embodiment shown, the configuration 82 adapted for a formlocking engagement is formed by a flatted portion.

We claim:

1. A belt retractor for a vehicle occupant restraining system, comprising:
   a load bearing frame which is provided with a cylindrical boss having an external screw thread and on which a nut may be screwed for the attachment of said belt retractor on a vehicle;
   said boss being sleeve-like; and
   an elongated guide pin extending through said boss is provided for guiding said nut to be screwed onto said boss.

2. The belt retractor of claim 1, wherein said guide pin is mounted in said boss with a press fit.

3. The belt retractor of claim 1, wherein said guide pin is provided with a head abutting a side of said bottom part facing away from said limbs.

4. The belt retractor of claim 3, wherein said head is provided with a detent recess.

5. The belt retractor of claim 3, wherein said head is provided with a detent groove.

6. The belt retractor of claim 1, wherein said boss has an end side facing said limbs and said guide pin is provided with detent projections which abut said end side of said boss.

7. The belt retractor of claim 1, wherein said guide pin is manufactured of plastic.

8. The belt retractor of claim 1, wherein said guide pin is provided with a central through hole, in which a signal pin is arranged.

9. The belt retractor of claim 8, wherein said signal pin is a separate part which is inserted into said guide pin.

10. The belt retractor of claim 9, wherein said signal pin is made from wire.

11. The belt retractor of claim 10, wherein said signal pin is made from spring wire.

12. The belt retractor of claim 8, wherein said signal pin is formed integrally with said guide pin.

13. The belt retractor of claim 12, wherein said guide pin has a free end facing away from said frame and said signal pin has a part which protrudes from said free end of said guide pin, said portion of said signal pin having a configuration adapted for a formlocking connection.

14. The belt retractor of claim 8, wherein said signal pin has a free end facing away from said frame and said signal pin has a part which protrudes from said free end of said guide pin, said signal pin being adapted for being pushed into said through hole, a press fit being formed between said signal pin and said through hole.

15. The belt retractor of claim 14, wherein said part of said signal pin projecting from said end of said guide pin, is colored with a marking color.

16. The belt retractor of claim 1, wherein said guide pin has a free end facing away from said frame, said free end being provided with cut-outs extending radially in relation to a longitudinal axis of said guide pin.

17. The belt retractor of claim 1, wherein said frame has a pair of limbs and wherein said guide pin extends beyond said limbs.

* * * * *